Figure 1:
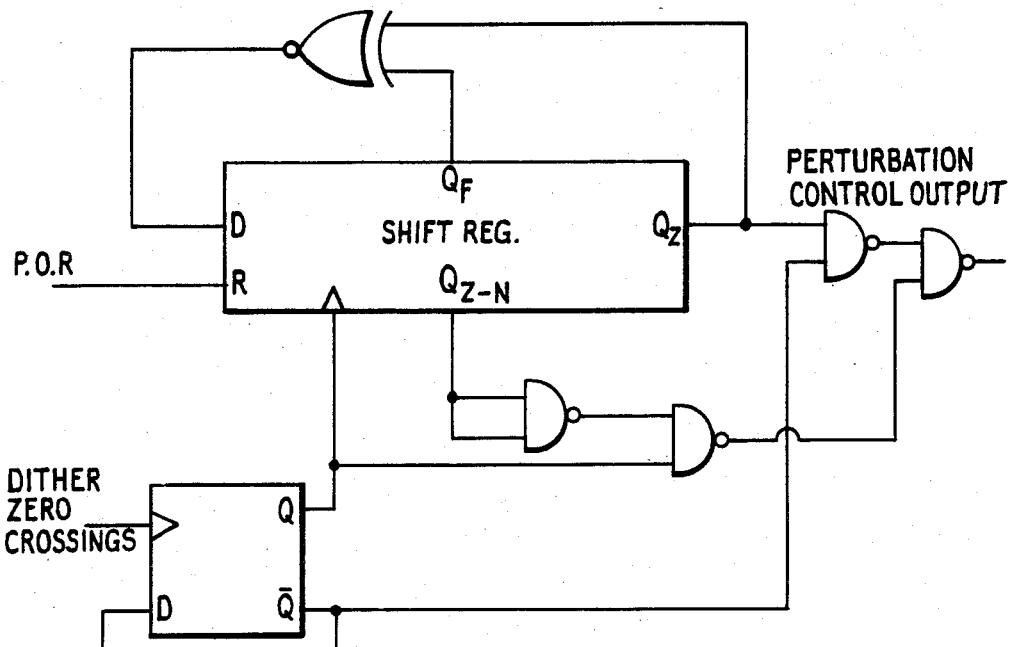

United States Patent [19]

Geen

[11] Patent Number: 4,653,920
[45] Date of Patent: Mar. 31, 1987

[54] RING LASER GYROSCOPES

[75] Inventor: John A. Geen, Bracknell, England

[73] Assignee: British Aerospace PLC, London, England

[21] Appl. No.: 659,555

[22] Filed: Oct. 10, 1984

[30] Foreign Application Priority Data

Oct. 11, 1983 [GB] United Kingdom ............... 8327124

[51] Int. Cl.⁴ ............................................. G01C 19/64
[52] U.S. Cl. ................................................... 356/350
[58] Field of Search .......................... 356/350; 331/78

[56] References Cited

U.S. PATENT DOCUMENTS

| | | | |
|---|---|---|---|
| 3,456,208 | 7/1969 | Ratz | 331/78 |
| 3,467,472 | 9/1969 | Killpatrick | 356/350 |
| 3,521,185 | 7/1970 | Ley | 331/78 |
| 3,612,690 | 10/1971 | Staats | 356/350 |
| 3,742,381 | 6/1973 | Hurd | 331/78 |
| 4,277,173 | 7/1981 | Ljung et al. | 356/350 |

Primary Examiner—Davis L. Willis
Assistant Examiner—S. A. Turner
Attorney, Agent, or Firm—Cushman, Darby & Cushman

[57] ABSTRACT

A ring laser gyroscope may be oscillated or dithered about its sensing axis to the known 'lock-in' effect. The diether motion can comprise an alternating component plus a random component generated by a random noise generator, e.g. a noise diode. The use of a true random noise generator may not always be practicable. Herein, there is proposed the dithering of a ring laser gyroscope with a motion including a component having a specifically Gaussian probability density. Such a component can be formed using a so-called pseudo-random sequence generator based on a shift-register.

7 Claims, 2 Drawing Figures

RING LASER GYROSCOPES

This invention relates to ring laser gyroscopes and more particularly to a method and apparatus for so 'dithering' a ring laser gyroscope as to reduce output errors due to the phenomenon known as 'lock-in'.

In a ring laser gyroscope, two laser beams travel in opposite directions around a closed loop path about an axis of rotation. Turning of the gyroscope about that axis causes the effective path lengths and hence also the frequencies of the beams to change differentially. By measuring the frequency difference, eg by observing the resultant effect in an interference pattern formed by the two beams, the rate of rotation of the gyroscope about the axis is obtained. At low rotational rates, the beams tend to resonate or 'lock-in' at the same frequency. In order to measure such low rotation rates therefore, the gyroscope may be oscillated or 'dithered' about the axis of rotation, the idea being that the rate of rotation is then always sufficient to avoid 'lock-in' and further that, because the dither is oscillatory, the resultant oscillatory component of the rate output signal cancels out during subsequent signal processing. However, as disclosed in U.S. Pat. No. 3,467,472 for example, for greatest accuracy, the waveform of the dither motion must include a random or noise component—if it comprises just a simple oscillatory motion, inevitably there will be a degree of signal correlation allowing periodic 'lock-in' occurrences or, perhaps more accurately, a kind of dynamic 'pull-in' effect where one beam is able to affect the phase of the other even if actual 'lock-in' does not occur. Whatever the explanation of the effect, the result, with time, may well be an accumulating gyroscope output error. The solution proposed by the above-mentioned U.S. patent is to drive the motor which produces the dither motion of the gyroscope with the sum of an alternating signal supplied by a drive signal generator plus the output of a random noise generator.

A problem with this solution is that the use of a true random noise generator, for example one base on a so-called noise diode, may not be practicable. For example, the noise amplitude it generates may be temperature dependent—this renders such a device unsuitable for use in say an airborne environment. Also, the term 'random noise' has quite a wide range of meaning and many, if not most, signals which would normally be classed as random noise do not in fact give good results in relation to the dithering of a laser gyro. For example, we have determined that it is very desirable for the mean amplitude of the dither to be reasonably constant. Also, the noise signal should not have such exaggerated low frequency components that gyro output errors only properly cancel out over times which are too long compared with practical flight times.

According to one aspect of the invention, there is provided, in combination, a ring laser gyroscope, motor means for dithering the gyroscope about its axis of rotation, and dither signal supply means for driving said motor means such that the waveform of the dither motion executed by the gyroscope comprises an oscillatory component amplitude modulated by a function having a specifically Gaussian probability density.

Advantageously, said dither signal supply means comprises first signal generating means for forming said oscillatory component second signal generating means for forming a modulation signal having a form which will generate said function in conjunction with the transfer function of the dither mechanism, and modulator means for modulating said oscillatory component with said modulation signal.

Preferably, the second signal generating means is operable to form a high-pass filtered pseudo-random binary sequence, and the combination of said gyroscope and said motor means has a response to the resulting dither signal which includes an integration term, resulting in the gyroscope executing a dither motion including a limited random walk. In this case, advantageously, the second signal generating means comprises a shift-register based pseudo-random sequence generator and means for subtracting from the output of the generator a time-shifted signal derived at an intermediate stage of the shift-register. The high-pass filtered pseudo-random binary sequence may be phase, frequency or amplitude modulated onto the output of the first signal generator, the result in each case being an amplitude modulation of the motion of the gyroscope.

According to a second aspect of the invention, there is provided a method of improving the accuracy of a ring laser gyroscope wherein the gyroscope is operated while being dithered about its axis of rotation, the waveform of the dither motion comprising an oscillatory component amplitude modulated by a function having a specifically Gaussian probability density.

Figure 2:
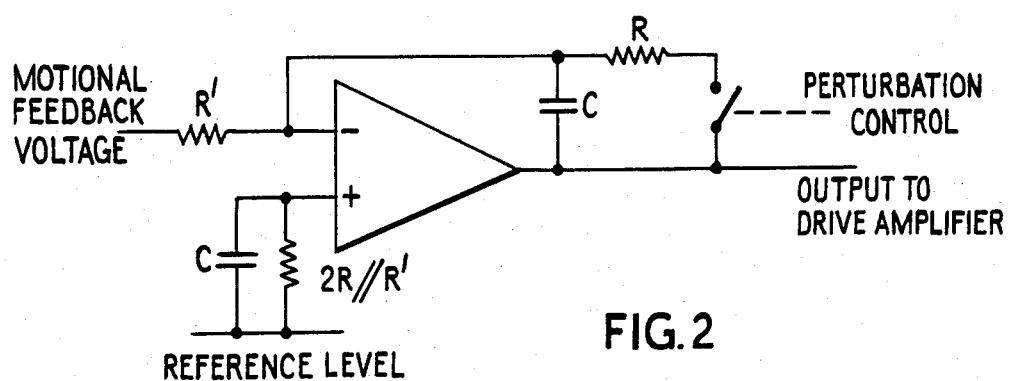

For a better understanding of the invention, reference will be made, by way of example, to the accompanying drawing, in which:

FIG. 1 is a simplified circuit diagram of a pseudo-random dither component generator, and FIG. 2 is a simplified circuit diagram of an integrator for use, in association with the dither drive and motion feedback elements of a ring laser gyroscope and the gyroscope itself, to form a dither drive oscillator.

The following first order analysis of dithered ring laser gyroscope behaviour is intended to demonstrate how output errors arise as a result of pseudo-lock-in phenomenon.

The rate of change of output phase is given approximately by, $$\dot{\psi} = a + b \cos(\omega t) + c \cos \psi$$

where a is the input angular rate multiplied by the gyro scale factor, b is the peak dither rate multiplied by the gyro scale factor, c is the locking threshold rate multiplied by the gyro scale factor, and $\omega$ is the dither angular frequency with respect to time, t. So, the output phase is $\psi = at + b/\omega \sin(\omega t) + \epsilon$ where $\epsilon$ is the error induced by the parameter, c. Becuse $\epsilon$ is very small compared with $b/\omega$ or the long term value of (at) one can write $$\dot{\epsilon} \approx c \cos(at + b/\omega \sin(\omega t))$$

which takes the standard form of a phse modulated signal, usually expanded for the purpose of sideband analysis as $\dot{\epsilon} \approx c \cos(at) J_o(b/\omega) +$ terms periodic in $\omega$ and its harmonics. On integrating this over a dither cycle, and provided $(a/f)$/modulo $2\pi$ is small, $\Delta \epsilon \approx (c/f \cos(\psi_o) J_o(b/\omega)$ where $f = \omega/2\pi$ and where $\psi_o$ is the value of $\psi$ at the start of the cycle.

Pseudo-locking takes place if there is a $\psi_o$ such that $\Delta \epsilon$ can cancel $(a/f)$/modulo $2\pi$ so that $\psi_o$ is also the starting phase modulo $2\pi$ for the subsequent cycles. An error of $(a/f)$/modulo $2\pi$ will then accrue each cycle.

The error rate is clearly $\dot{E}=cJ_o(b/\omega)\cos(\psi_o)$ and is a non-linearity which recurs at intervals of $2\pi f$ along the input axis of the gyro rate transfer function. As $b/\omega$ is always large in practice one may use an asymptotic expansion $$\dot{E}(b) = c\sqrt{\left(\frac{2\omega}{\pi b}\right)}\cos\left(\frac{b}{\omega} - \frac{\pi}{4}\right)\cos(\psi_o)$$

which, again because $b/\omega$ is large, shows the error to be very sensitive to the small proportional changes in b. In practice, one cannot stabilise the mean value of b to high precision. As well as the stability of the drive circuits it depends on the inertia and stiffness of the gyro mount which includes such variables as the configuration of the connecting cables. So, this error takes the form of an in-run or run-to-run instability which cannot be compensated by calibration and has too long a time-scale to be treated as noise.

The purpose of the random variation in b is to convert the phase rate error into a random noise by distributing $\dot{E}(b)$ over a range similar to the one outlined earlier in this section, it is not difficult to show that if a pseudo-random sequence is used, of length n cycles, then there is still a pseudo-locking effect of smaller magnitude but recurring at intervals of $2\pi f/n$ in signal space. Consequently, if a periodic variation is used it must be of long enough period for rate quantisation of the order $\omega/n$ to be negligible in the chosen application. The optimum form of the random variation is the one which has a long period, if any, and which, without being large, produces a stable mean value of the resulting output noise despite variations in the mean value of dither.

If the mean level of dither is $b_o$ and the p.d.f. of the variation of b is $5(b-b_o)$ then the mean error rate is $$<\dot{E}>(b_o) = \left[\int_{-\infty}^{\infty} S(b-b_o)\dot{E}(b)db\right] \bigg/ \left[\int_{-\infty}^{\infty} S(b-b_o)db\right]$$

and the objective is to make $<\dot{E}>$ as insensitive as possible to fluctuations in $b_o$ or the effective width of S for as small as possible an effective width of S.

Considering the form of E(b), the convolution integral has the form of a Fourier cosine transform. Thus, a suitable form for S is Gaussian because the Fourier transform of a Gaussian is itself a Gaussian which gives rapidly vanishing functions for both S and $$<\dot{E}> = \frac{\left[c\cos(\psi_o)\sqrt{\left(\frac{2\omega}{\pi b_o}\right)} \int_{-\infty}^{\infty} \exp\left(-\left[\frac{\alpha}{\omega}(b-b_o)\right]^2\right)\cos\left(\frac{b}{\omega} - \frac{\pi}{4}\right)db\right]}{\int \exp\left(-\left[\frac{\alpha}{\omega}(b-b_o)\right]^2\right)db}$$

At this point it is convenient to change the variable to $x=(b-b_o)/\omega$ and to note that, on expanding the cosine, the integral involving the odd function, sinx, vanishes.

$$<\dot{E}> = $$

$$\frac{c\cos(\psi_o)\cos\left(\frac{b_o}{\omega} - \frac{\pi}{4}\right)\left(\frac{2\omega}{\pi b_o}\right)\int_{-\infty}^{\infty}\exp(-[\alpha x]^2)\cos x\, dx}{\int\exp(-[\alpha x]^2)dx}$$

The integrals are standard forms, $$\sqrt{\left(\frac{\pi}{\alpha}\right)}\exp\left(-\left[\frac{1}{2\alpha}\right]^2\right) \text{ and } \sqrt{\left(\frac{\pi}{\alpha}\right)}$$

for numerator and denominator respectively. So $$<\dot{E}> = c\cos(\psi_o)\cos\left(\frac{b_0}{\omega} - \frac{\pi}{4}\right)\left(\frac{2\omega}{\pi b_0}\right)\exp\left(-\left[\frac{1}{2\alpha}\right]^2\right)$$

To obtain the r.m.s. instability, I, one can assume that all unwanted long term perturbations to $(b_o/\omega)$/modulo $2\pi$ are equally likely and that all values of $\psi_o=(a/f)$/modulo $2\pi$ are equally likely in the test situations. In those circumstances.

$$I = c\sqrt{\left(\frac{\omega}{2\pi b_o}\right)}\exp\left(-\left[\frac{1}{2\alpha}\right]^2\right)$$

or if a component, $\eta$, of the earth's rate is habitually used for the testing this expression can be multiplied by $$\sqrt{2}\cos\left(\frac{\eta F}{f}\right)$$

where F is the gyro scale factor. Rearranging, $$\frac{1}{2\alpha} = \sqrt{\ln\left(\frac{c}{I}\sqrt{\left(\frac{\omega}{2\pi b_o}\right)}\right)}$$

Now the 1/e half width of S is $x=1/a$, or in gyro output fringes the half width is $$\frac{1}{2\pi\alpha}\text{ or }\frac{1}{\pi}\sqrt{\ln\left(\frac{c}{I}\sqrt{\left(\frac{\omega}{2\pi b_o}\right)}\right)},$$

which, in practice, is acceptably small.

Having established that a Gaussian p.d.f. for the random variation in dither amplitude is satisfactory, there remains the problem of producing that p.d.f. in a practical situation.

Consider the spring and inertia mechanical dither system to have an inertia, J, an amplitude of oscillation A and a change in amplitude $\Delta$ during a half dither cycle when the effective drive voltage is $v$.

For an oscillatory system, by definition, energy dissipated in losses per half cycle = $\pi/Q$·energy storage. So by conservation of energy $$\frac{J}{2}[(A+\Delta)^2 - A^2] = kAv - \left(\frac{\pi}{Q}\right)\cdot\left(\frac{JA^2}{2}\right)$$

where k is a constant dependent on the geometry and piezoelectric coefficients of the drive elements and $v$ is the amplitude of that component of the drive waveform in quadrature with the mechanical motion or, as $\Delta$ is small compared with A in the usual, high Q, system $$JA\Delta = kAv - \frac{\pi JA^2}{2Q}$$

$$\text{ie } \Delta = \frac{kv}{J} - \frac{\pi A}{2Q}$$

If the mean level of $v$ is $v_o$ and the corresponding equilibrium value of A is $A_o$ then $$\frac{k}{J}v_0 = \frac{\pi A_0}{2Q} \text{ and } \frac{\Delta}{A_0} = \frac{\pi}{2Q}\left[\frac{v}{v_0} - \frac{A}{A_0}\right]$$

ie as far as perturbations in amplitude at nominal dither frequency are concerned, the transfer function from drive to mechanical motion behaves as a single-pole low-pass filter with break frequency $\frac{1}{2}Q$ times the dither frequency. So, the system will act as an integrator for up to 4Q half cycle perturbations of the drive.

To avoid the possibility of short term (ie half cycle to half cycle) pseudo-locking, the change in amplitude needs to be greater than the maximum angle error per half cycle.

As already shown this error is approximately $$\frac{c}{2f}\sqrt{\frac{2\omega}{\pi b}}$$

or as a fraction of the dither excursion, $2b/\omega$ it is $$\frac{c}{b}\sqrt{\frac{\pi\omega}{2b}},$$

which may be substituted for $\Delta/A_o$ to yield the drive fluctuation $v/v_o$ needed to generate it.

It is a standard result that the probability of a displacement between x and $x+\Delta x$ from N steps of length, L, in one dimensional random walk is given by $$p(x,N) \approx \frac{\Delta x}{2\pi NL^2}\exp\left[-\frac{x^2}{2NL^2}\right]$$

for large N. That is, a Gaussian p.d.f. with 1/e half width of $\sqrt{2NL^2}$. So, if the drive voltage to the dither system undergoes a random walk of r times the nominal each half cycle, using the previous results, the response will suffer a perturbation which is Gaussian with a 1/e half width of $$\sqrt{2(4Q)\left(\frac{r\pi}{2Q}\right)^2} = r\pi\sqrt{\frac{2}{Q}},$$

that is, a standard deviation of $$\frac{r\pi}{\sqrt{Q}}.$$

It is readily shown that, if the short term errors are made acceptably small, the corresponding peak to peak perturbation is too large to make the other dither dependent errors negligible and does not approach the optimum value derived earlier.

However, the extremes of perturbation can be limited by restricting the number of steps which are integrated, that is, by changing the break frequency of the low-pass filter to a higher value. The actual value of N needed can be calculated from the expressions already derived.

As opposed to altering the mechanics to give this break frequency (the low value of Q needed might require too much drive power for the thermal constraints of an airborne application) it is preferred to implement this filtering in the drive circuits.

It has been usual to generate the random walk of the drive by digital means to avoid sensitivity to temperature, power supplies and so on. The most convenient and economical way is to perturb or not perturb the effective drive voltage in accordance with the output of a shift-register operated with modulo 2 feedback to generate a pseudo-random binary sequence (p.r.b.s.). The low frequency output of this arrangement can be limited very simply by tapping into the shift register N stages back from the output and subtracting this, time displaced signal from the output.

A possible means of achieving this is shown in FIG. 1. To implement the subtraction it uses the integrating nature of the mechanics and alternates the shift-register output with the inverse of the time displaced output. Depending on the length of p.r.b.s. used, a more complex feedback might be needed.

The length of the shift-register is determined as described earlier. If a maximal sequence is used it has length $2^Z - 1$ where Z is the shift-register length. The illustrated circuit would, therefore, generate a sequence $2(2^Z - 1)$ half cycles long and the separation of the pseudo-locking bands would be $\omega/(2^{Z+1} - 2)$. The case Z=18, which is found to be adequate for navigation purposes, can in fact be implemented with the above circuit, the feedback tap being F=7 or F=11.

If, for convenience, the same tap $Q_{11}$ were used for $Q_{Z-N}$ (ie N=7) then the standard deviation of the perturbation is found to be acceptable by the previous criteria.

It may be that the most economical means of implementing the dither is by a self oscillator. Such an oscillator needs a 90° phase shift in the electronics between drive transducer and motional feedback transducer. Meanwhile it may be that a form of frequency or phase modulation would produce a more efficient drive than amplitude modulation for a given amount of dither perturbation. These two concepts may be combined, ie the perturbation can be introduced by using an analogue switch to pull the phase of the 90° phase shifting network of a self oscillator. The preferred amount by which that phase is pulled can be derived from the analysis given earlier, ie it should be enough to reduce the effective drive voltage by the required proportion k, ie $\cos \phi = 1 - k$. The corresponding tangent is approximately $\sqrt{2k}$ so if an integrator is used, as shown in FIG. 2. $X_c/R = \sqrt{2k}$ at the dither frequency ie $$\omega CR = \frac{1}{\sqrt{2R}}.$$

Note tht the continual switching assures the D.C. working point of the integrator.

If a piezoelectric feedback transducer is used then R' can be eliminated, R becomes the main feedback path and C is switched on zero crossings.

We claim:

1. Gyroscope apparatus comprising a ring laser gyroscope, motor means for dithering the gyroscope about it axis of rotation, and dither signal supply means for driving said motor means such that the waveform of the dither motion executed by the gyroscope comprises an oscillatory component amplitude modulated by a function having a specifically Gaussian probability density.

2. Apparatus according to claim 1, wherein said dither signal supply means comprises first signal generating means for forming said oscillatory component, second signal generating means for forming a modulation signal having a form which, in conjunction with the transfer function of the dither mechanism, will generate said function, and modulator means for modulating said oscillatory component with said modulation signal.

3. Apparatus according to claim 2, wherein the second signal generating means is operable to form a highpass filtered pseudo-random binary sequence, and the combination of said gyroscope and said motor means has a response to said dither signal which includes an integration term such that the gyroscope executes a dither motion including a limited random walk.

4. Apparatus according to claim 3, wherein the second signal generating means comprises a shift-register based pseudo-random sequence generator and means for subtracting from the output of the generator a time-shifted signal derived at an intermediate stage of the shift-register.

5. A method of improving the accuracy of a ring laser gyroscope wherein the gyroscope is operated while being dithered about its axis of rotation, the waveform of the dither motion comprising an oscillatory component amplitude modulated by a function having a specifically Gaussian probability density.

6. Gyroscope apparatus comprising:
 a ring laser gyroscope for sensing rotation of the gyroscope about a sensitive axis associated with the gyroscope;
 motor means coupled to said gyroscope for dithering the gyroscope about said sensitive axis to reduce lock-in errors of the gyroscope;
 first signal supply means for supplying an oscillatory signal;
 second signal supply means for supplying a random noise signal; and
 modulating means connected to said first and second signal supply means and to said motor means and operable for modulating one of the amplitude, phase and frequency of said oscillatory signal with said noise signal to produce a motor means drive signal for causing the dither motion of the gyroscope to comprise a randomly amplitude modulated oscillation;
 said apparatus incorporating noise frequency filtering means for causing the random component of the dither motion of the gyroscope to be band-pass filtered.

7. Apparatus according to claim 6, wherein said filtering means comprises circuit means incorporated in said second signal supply means to form a random noise signal having only frequency components above a lower limit and wherein the overall response characteristics of said gyroscope and said motor means includes an integrating term for rendering the gyroscope non-responsive to noise frequency components above an upper limit.

* * * * *